J. A. GOODSELL.
RAKE TEETH CLEANER.
APPLICATION FILED MAR. 21, 1914.
1,144,703.
Patented June 29, 1915.
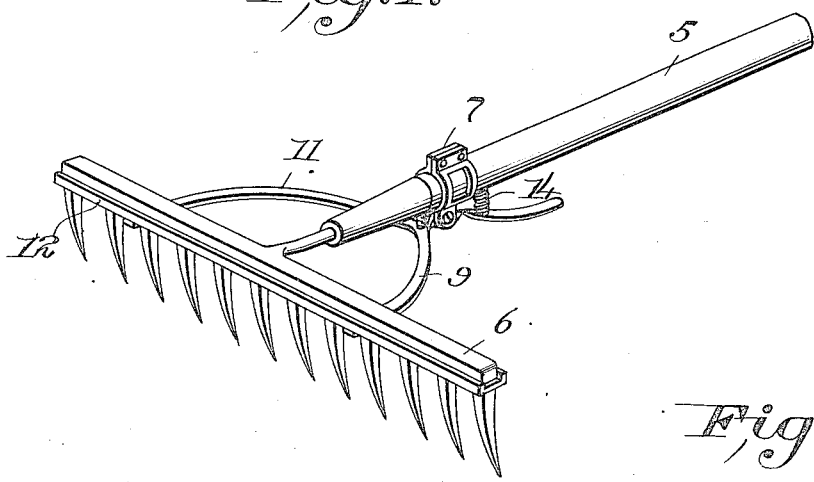
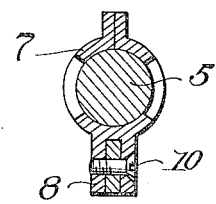
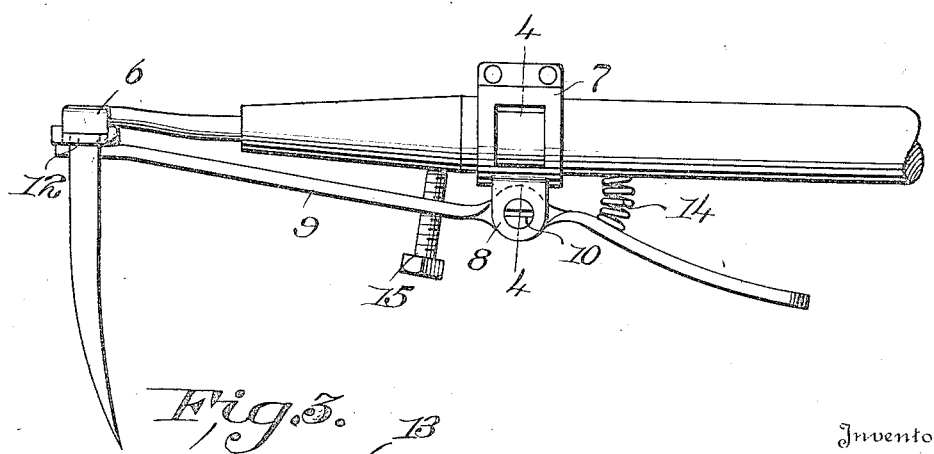
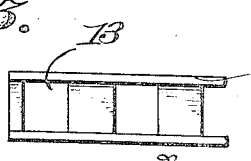
Witnesses
Inventor
James A. Goodsell,
By
his Attorney

UNITED STATES PATENT OFFICE.

JAMES ARTHUR GOODSELL, OF HUDSON, MICHIGAN, ASSIGNOR OF FORTY ONE-HUNDREDTHS TO WILLIAM MYERS, OF HUDSON, MICHIGAN.

RAKE-TEETH CLEANER.

1,144,703.

Specification of Letters Patent.

Patented June 29, 1915.

Application filed March 21, 1914. Serial No. 826,282.

*To all whom it may concern:*

Be it known that I, JAMES ARTHUR GOODSELL, a citizen of the United States, residing at Hudson, in the county of Lewanee and State of Michigan, have invented certain new and useful Improvements in Rake-Teeth Cleaners, of which the following is a specification.

This invention relates to rake teeth cleaners, adapted for use in connection with garden rakes now in use.

One of the principal objects of this invention is to construct a device applicable for the dual purpose of cleaning the rake teeth, likewise preventing the teeth from penetrating too deeply during the raking operation.

Other objects as well as the nature, characteristic features and scope of my invention will be more readily understood from the following description taken in connection with the accompanying drawings and pointed out in the claims forming a part of this specification.

Referring to the drawings: Figure 1 is a perspective view of an ordinary garden rake illustrating the application of my cleaner. Fig. 2 is a side elevation of the same, showing to advantage the means for retaining the cleaning element in a predetermined position on the rake teeth, Fig. 3 is a detail enlarged plan view of the cleaning bar, portions thereof being broken away, and Fig. 4 is a cross sectional view taken on the line 4—4 of Fig. 2.

In the drawings wherein is illustrated the preferred embodiment of this invention, an ordinary garden rake is provided which in the present instance comprises the usual handle 5 with which is associated the rake teeth 6. Mounted on the handle 5 is a bracket 7 which in the present instance comprises a pair of substantially semi-cylindrical sleeves, each of which has depending therefrom an ear 8, said ears having pivotally mounted therebetween an actuating lever 9 which is detachably associated with said ears through the medium of a screw 10. One end of the lever 9 has integrally formed thereon a semi-circular member 11, the free ends of the latter being in engagement with the cleaning bar 12. The cleaning bar comprises an elongated metallic plate which is channeled intermediate its marginal sides in order to provide a groove in which the tooth bar of the rake is mounted. The bar 12 is provided with a multiplicity of uniformly spaced openings 13 through which the teeth of the rake engage, the openings 13 being sufficiently large to permit of an unevenness in the spacing of the teeth which sometimes occur in the ordinary garden rakes. The opposite end of the lever 9 from that on which the bar 12 is formed extends downwardly from the bracket 7, so as to be actuated by the foot or hand of the operator as desired, said end being normally held in a downward position through the medium of an elastic element 14, the latter in the present instance comprising a coil spring, thereby retaining the cleaner bar 12 normally in engagement with the upper or inner terminal of the teeth on the rake 6 and in engagement with the bar of the teeth.

It is well known in this art that very often the teeth of a garden rake, which are pointed at their free ends penetrate the soil so as render the raking operation a very laborious one. It is one of the objects of this invention therefore, to facilitate this operation by the provision of an adjusting element 15 which comprises a set-screw engaging through the lever 9 adjacent its pivot point. As shown to advantage in Fig. 2, the inner end of the set-screw 15 engages with the handle 5 thereby permitting the bar 12 to be adjusted to any predetermined position on the teeth of the rake 6 thereby regulating the depth of penetration of the teeth in the soil.

In operation, we will assume that the cleaning element is in the position as shown to advantage in Fig. 2. In such instance when it is desired to actuate the bar 12 to release the teeth of the rake 6, of any adhering material, pressure is exerted on the free end of the lever 9, thereby causing the bar 12 to operate on the teeth of the rake, as is obvious, said lever being automatically returned to a position in engagement with the tooth bar of the rake by the spring 14. Of course when it is desired to prevent the teeth penetrating the soil, the screw 14 is threaded through the lever 9 until the desired point of adjustment has been reached.

It will be understood that the above description and accompanying drawings comprehend only the general and preferred embodiment of my invention and that various minor changes in details of construction, proportion and arrangement of parts, may be made within the scope of the appended claims and without sacrificing any of the advantages of my invention.

Having thus fully described my invention, what I claim as new and desire to secure by Letters Patent is:

1. A rake teeth cleaner including in combination with a rake embodying a handle and teeth, a cleaner element associated with the teeth having an operating portion extending therefrom to engage the handle, and an adjustable element carried by the operating portion and coacting with the handle for regulating the depth of the penetration of the teeth.

2. A rake teeth cleaner including in combination with a rake handle a bar normally lying in engagement with the rake bar at the inner terminal of the teeth, and a set-screw in connection with the cleaner bar cooperating with the rake handle to permit of the minute adjustment of the bar on the teeth whereby the depth of penetration of the rake teeth is regulated.

3. A rake teeth cleaner including a cleaning element comprising an elongated channeled bar in which the tooth-bar of the rake engages, means associated with the handle of the rake for actuating said cleaner bar, and a set-screw mounted in said operating means and having engagement with the handle of the rake for disposing said cleaner bar at a predetermined position on the teeth of the rake.

4. A rake teeth cleaner including a cleaning bar provided with a multiplicity of uniformly spaced apart openings through which the teeth of the rake engage, said bar being channeled in order to snugly engage with the tooth bar of the rake, a lever pivotally mounted on said handle and having engagement with said cleaning bar for actuating the latter, means for normally holding said cleaning bar in engagement with the tooth bar of the rake, and a set-screw mounted in said lever for holding said cleaning bar in spaced relation to the tooth bar of the rake for regulating the depth of penetration of the teeth during the raking operation.

In testimony whereof I affix my signature in presence of two witnesses.

JAMES ARTHUR GOODSELL.

Witnesses:
FRED. E. WORDEN,
W. S. HAZEN.